Figure 1:
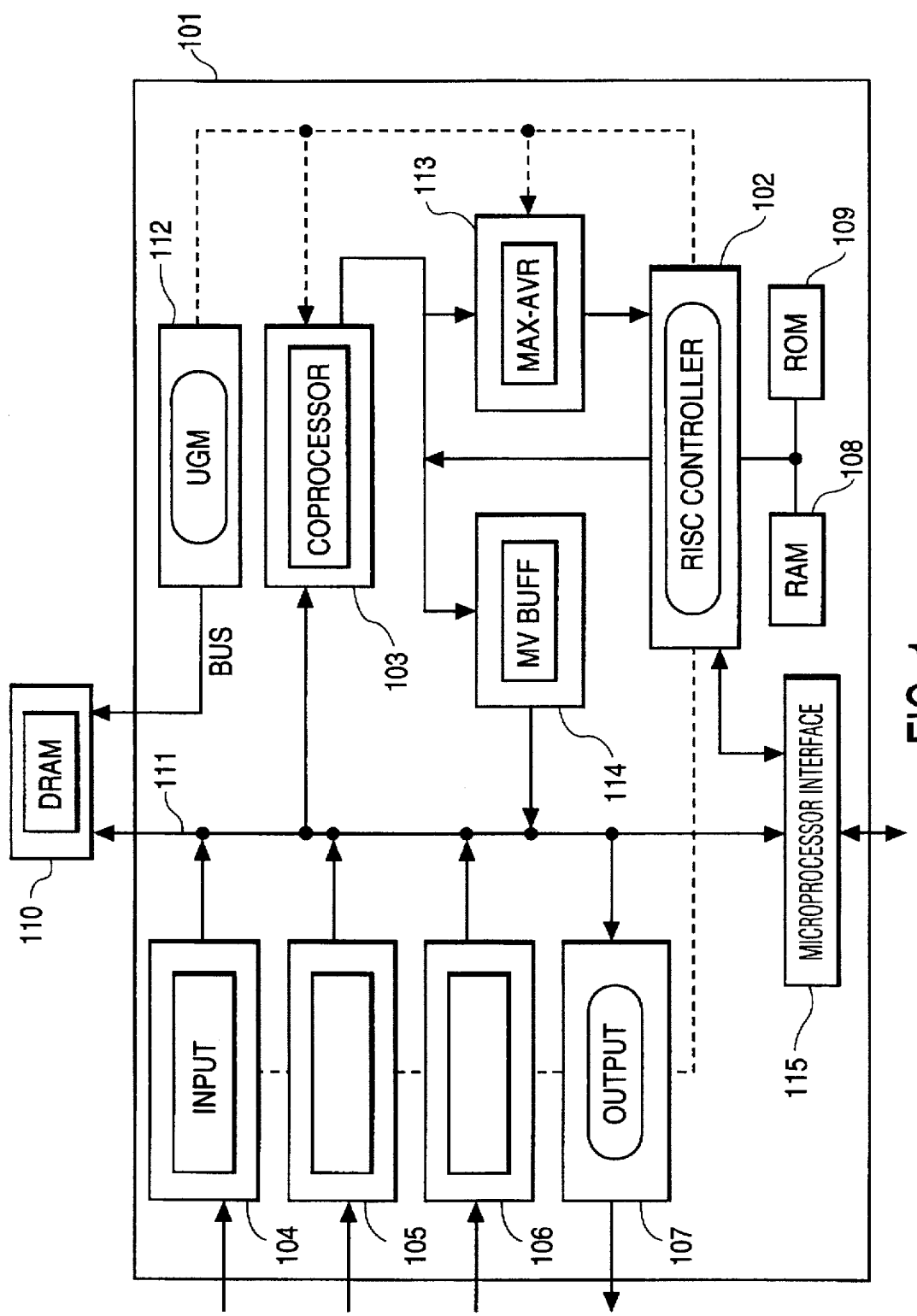

United States Patent [19]
Pirson et al.

[11] Patent Number: 5,717,615
[45] Date of Patent: Feb. 10, 1998

[54] METHOD FOR SELECTING MOTION VECTORS AND IMAGE PROCESSING DEVICE IMPLEMENTING THE SAID METHOD

[75] Inventors: Alain Pirson, Moirans; Didier Chariot, Grenoble, both of France

[73] Assignee: THOMSON multimedia S.A., France

[21] Appl. No.: 562,976

[22] Filed: Nov. 27, 1995

[30] Foreign Application Priority Data

Dec. 13, 1994 [FR] France .................. 94 15010

[51] Int. Cl.⁶ .................. G06F 7/00; H04N 5/14
[52] U.S. Cl. .................. 364/715.01; 348/699
[58] Field of Search .................. 364/715.01; 348/699, 348/416, 413, 407, 402

[56] References Cited

U.S. PATENT DOCUMENTS 4,864,393  9/1989  Harradine et al. .................. 348/699
5,327,232  7/1994  Kim .................. 348/412
5,428,403  6/1995  Andrew et al. .................. 348/699
5,537,155  7/1996  O'Connell et al. .................. 348/699

FOREIGN PATENT DOCUMENTS

4226128A1  8/1992  Germany.

Primary Examiner—Tan V. Mai
Attorney, Agent, or Firm—Joseph S. Tripoli; Ronald H. Kurdyla; Alexander J. Burke

[57] ABSTRACT

A method of selecting motion vectors in a motion estimation system involves calculating values of an evaluation function. Each evaluation function value corresponds to a block of pixels of a reference window with respect to a current block of pixels and the relative position of the blocks is described by a motion vector. The method also involves determining the smallest value of the evaluation function and comparing the norms of the vectors associated with the smallest value. The vector having the smallest norm is selected from the associated motion vectors.

9 Claims, 8 Drawing Sheets

METHOD FOR SELECTING MOTION VECTORS AND IMAGE PROCESSING DEVICE IMPLEMENTING THE SAID METHOD

The present invention relates to a method of selecting motion vectors and to a device implementing this method. The method or device in accordance with the invention is used in particular in television image encoders which use a method of motion compensation.

A number of image compression systems are based on blockwise pixel processing. In the case of MPEG2 (standing for "Motion Picture Expert Group"), the images are divided into blocks of 8*8 pixels, four blocks being assembled into a macroblock of 16*16 pixels. The blocks or the macroblocks undergo various processing operations for reducing the redundancy between images and within an image. One of the processing operations used is motion estimation. This method consists in estimating the displacement of part of the current image with respect to previous or future images. One or more motion vectors which define the displacement are thus determined. These motion vectors enable a prediction of the current image to be obtained from previous or future images. The difference between this prediction and the current image is then determined and it is this difference which is used for the subsequent compression. At present, motion vectors are used for so-called "inter" and "bi-directional" images, but can equally be used for so-called "intra" images for the purpose of reducing the effects of any transmission errors.

Motion estimation is generally performed for each macroblock. Instead of a previous image, it is also possible to use a reference image stored in the encoder, this image corresponding to the image decoded by a decoder (that is to say an image which takes into account information loss due to compression).

A technique for determining the "best" macroblock in the reference image consists in comparing the current macroblock with each macroblock of the reference image. As comparison criterion, an error function Err is defined, calculated for each possible position of the macroblock in the reference image. The position giving the smallest value for the function Err will determine the displacement vector. This latter may be of various accuracies, depending on the computational capacity available and on the passband reserved for coding the motion vectors. An accuracy of a fraction of a pixel can be realized by inter-pixel interpolation. If the motion vectors are restricted in length, a search window of appropriate size is placed around the position defined by the current macroblock.

Calculation of the motion vectors demands large computational capacities which increase with the accuracy desired, the resolution of the image, their frequency etc.

An error function which is conventionally used is:

$$Err(m,n) = \sum_i \sum_j D(a(i,j), b(i+m, j+n))$$

where i and j denote positions inside a macroblock, where m and n denote the coordinates of a motion vector and where a and b denote respectively luminance values of pixels of the current macroblock and of the displaced macroblock of the search window or image.

The function D may be for example $D(x,y)=|x-y|$.

However, several motion vectors may correspond to the same minimum value of the error function. In particular, a similar problem is addressed in American Patent U.S. Pat. No. 5,327,232 of 5 Jul. 1994, but the solution proposed is complex.

The subject of the invention is a method of selecting motion vectors in a system comprising a motion estimator, the said motion estimator calculating values of an evaluation function, each value corresponding to a block of pixels of a reference window with respect to a current block of pixels, the relative position of the said blocks being described by a motion vector, the said method being characterized in that it comprises the steps of determining the smallest value of the said evaluation function, of comparing the norms of the vectors associated with the said smallest value, of selecting, from the said associated vectors, the vector having the smallest norm.

According to a particular embodiment, the calculation of the norm of the said vectors is performed according to the function:

$$\|(x,y)\| = \max\{|x|, |y|\} \qquad (2)$$

where X and Y represent the coordinates of a vector.

According to a particular embodiment, in particular, with the coordinates of the vectors being two's complement coded, a modified absolute value of one of the coordinates is obtained by reversing the bits of the coordinate when the said coordinate is negative.

According to a particular embodiment, the reference window is scanned in such a way that the coordinates of the motion vectors are increasing functions, and that when several vectors correspond to the said smallest value of the evaluation function, the last vector in the order of scanning is chosen.

According to a particular embodiment, the evaluation function is of the form:

$$Err(m,n) = \sum_i \sum_j D(a(i,j), b(i+m, j+n))$$

with $D(x,y)=|x-y|$ or $D(x,y)=\sqrt{(x^2+y^2)}$.

The subject of the invention is also an image processing device comprising a motion estimator, the said motion estimator calculating values of an evaluation function, each value corresponding to a block of pixels of a reference window with respect to a current block of pixels, the relative position of the said blocks being described by a motion vector, the said device being characterized in that it comprises:

means for calculating the norm of the motion vectors, means for comparing values of an evaluation function associated with each of the vectors, means for comparing the norm of at least the vectors associated with the most advantageous value of the said evaluation function and means for storing one of the vectors possessing the smallest norm.

According to a particular embodiment, the said evaluation function is a function of the distortion existing between the current block and the block of the reference window.

According to a particular embodiment, the means for calculating the norm of a vector include logic gates performing an exclusive or between each component of the vector and its sign bit.

According to a particular embodiment, the calculating means moreover include a comparator and a multiplexer whose function is to determine the smallest value of the components on output from the exclusive or.

For further information on the use of motion vectors in image compression to MPEG standards, reference may be made to:

"Information technology, Generic coding of moving pictures and associated audio, Recommendation H.262 ISO/IEC 13818-2 (Video) Committee Draft of November 1993."

Figure 2A:
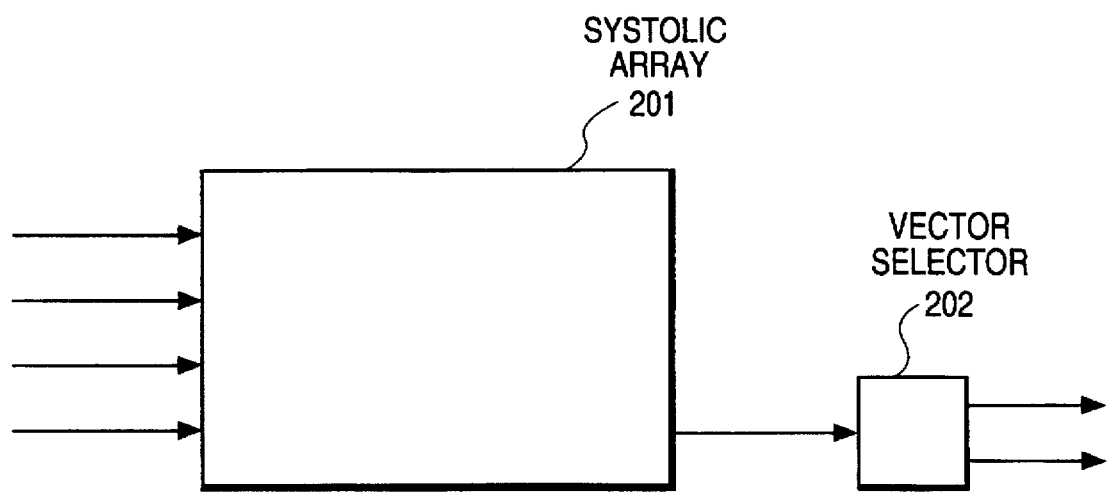
Figure 2B:
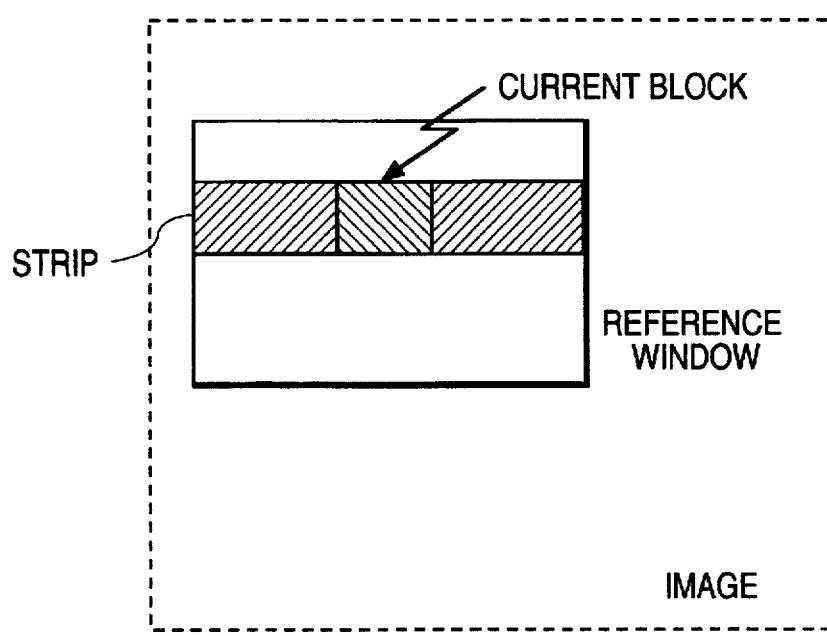
Figure 3:
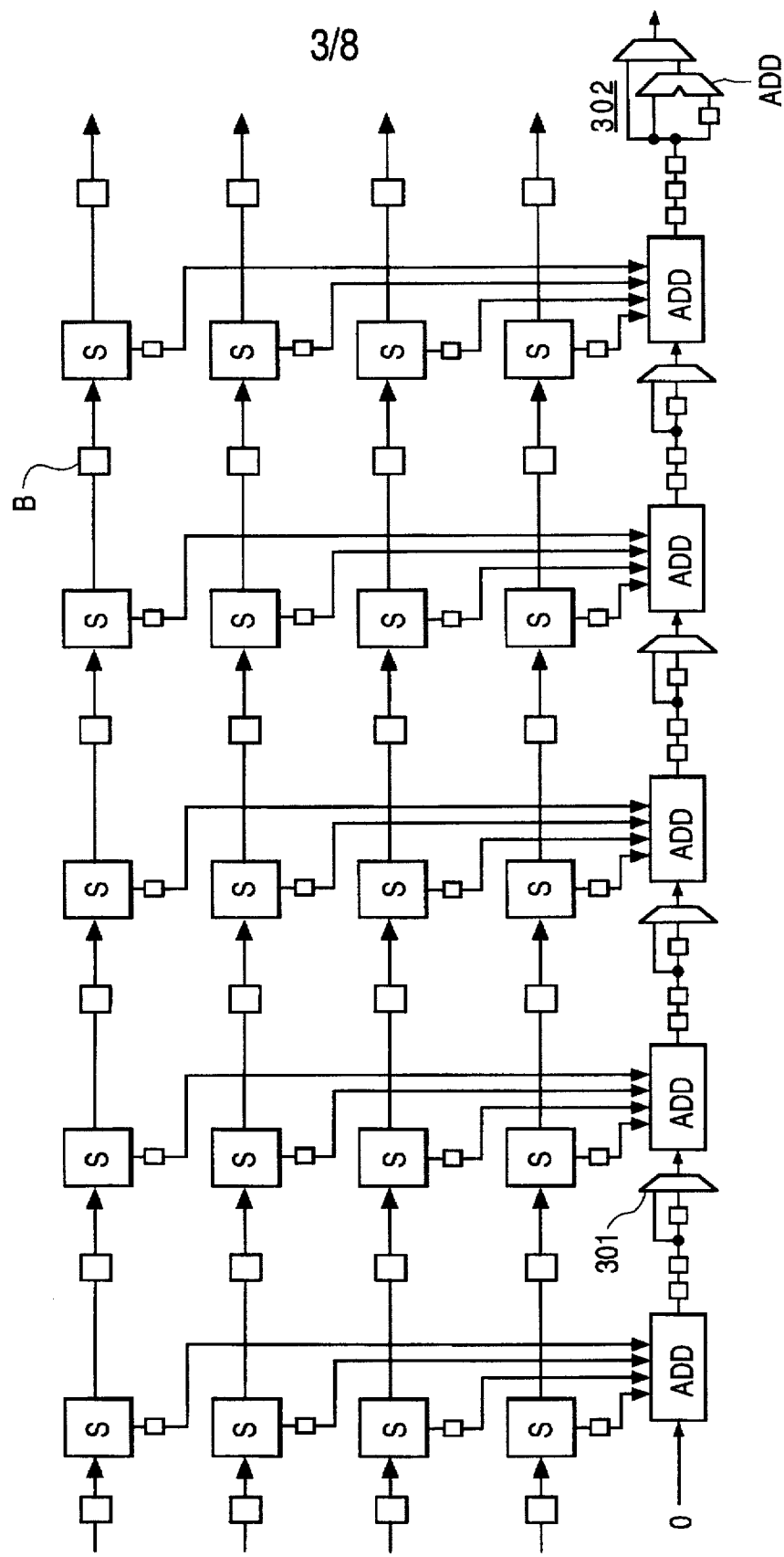
Figure 4:
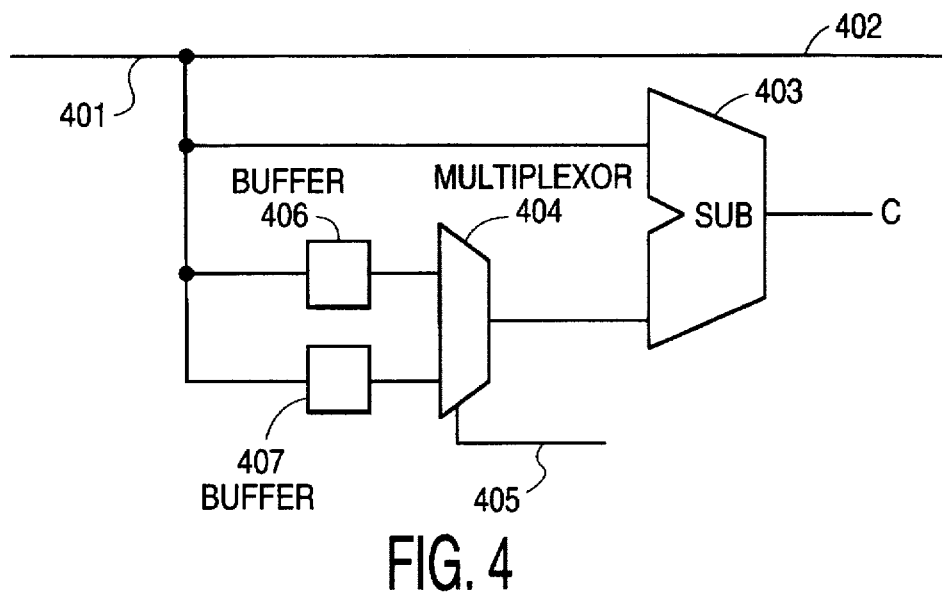
Figure 8:
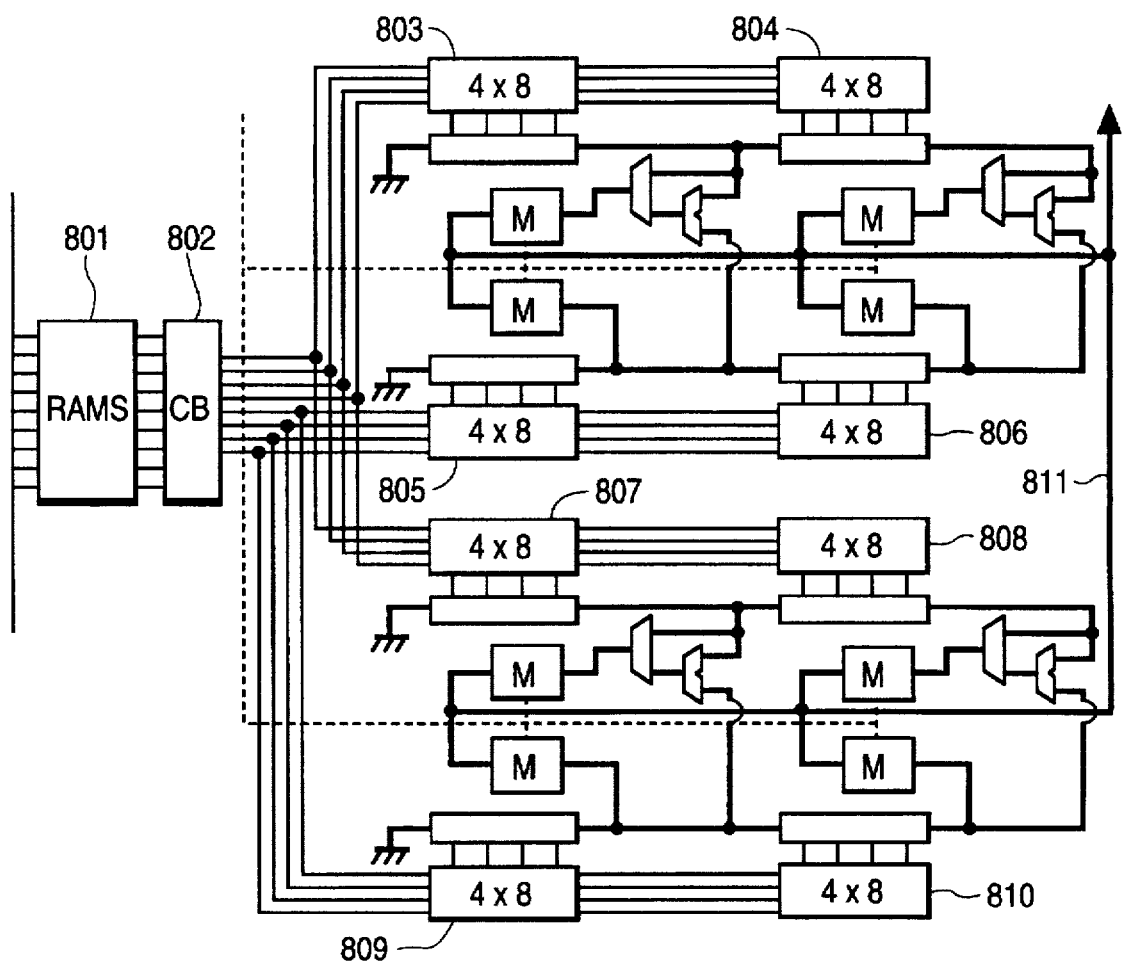
Figure 5:
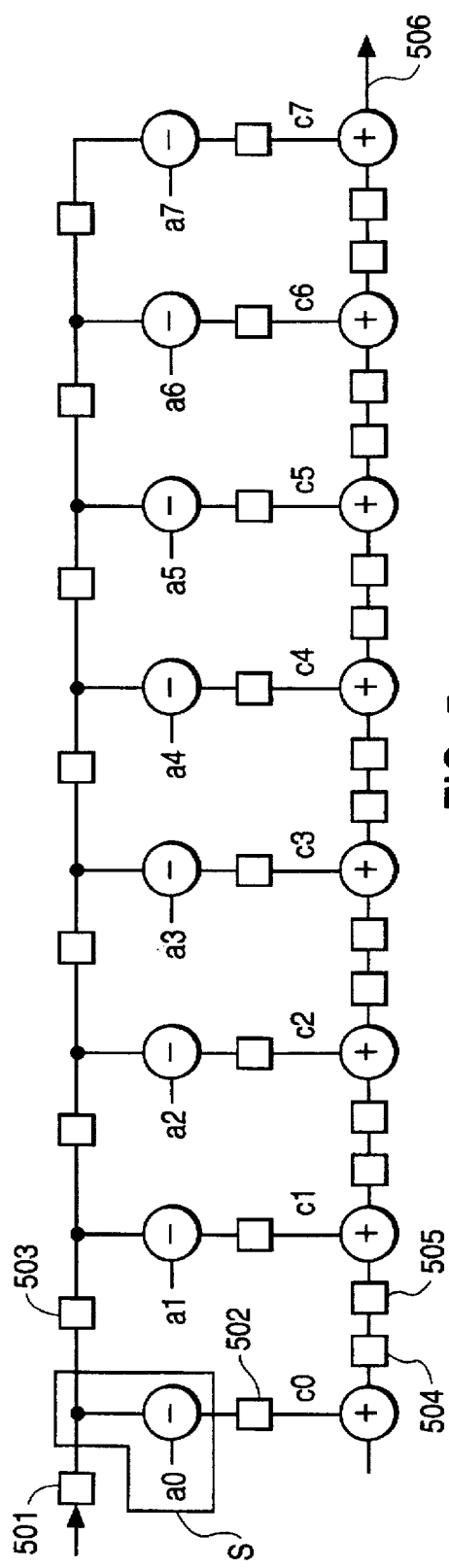
Figure 6:
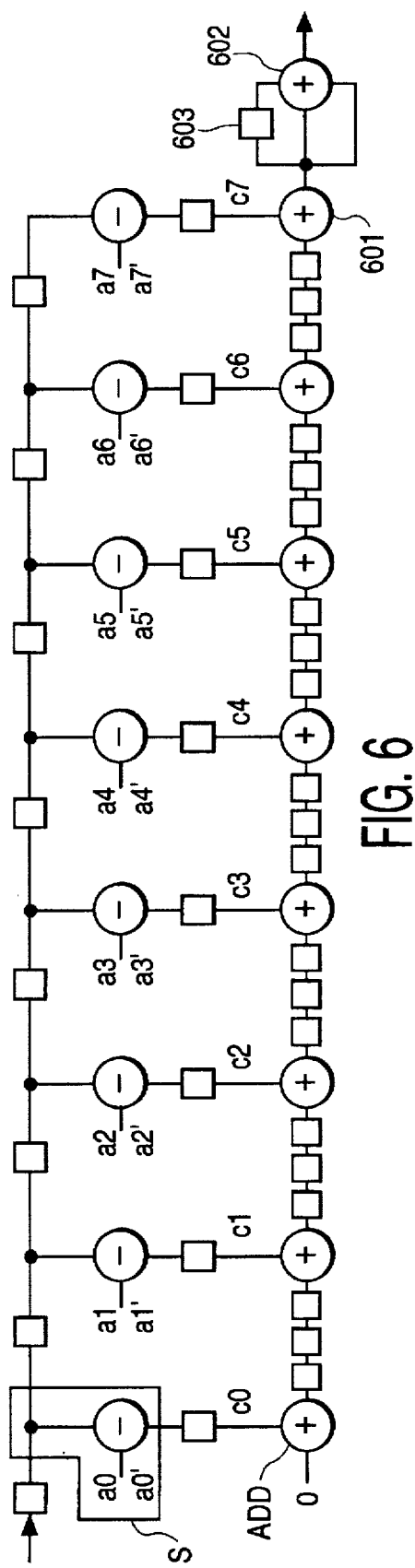
Figure 7:
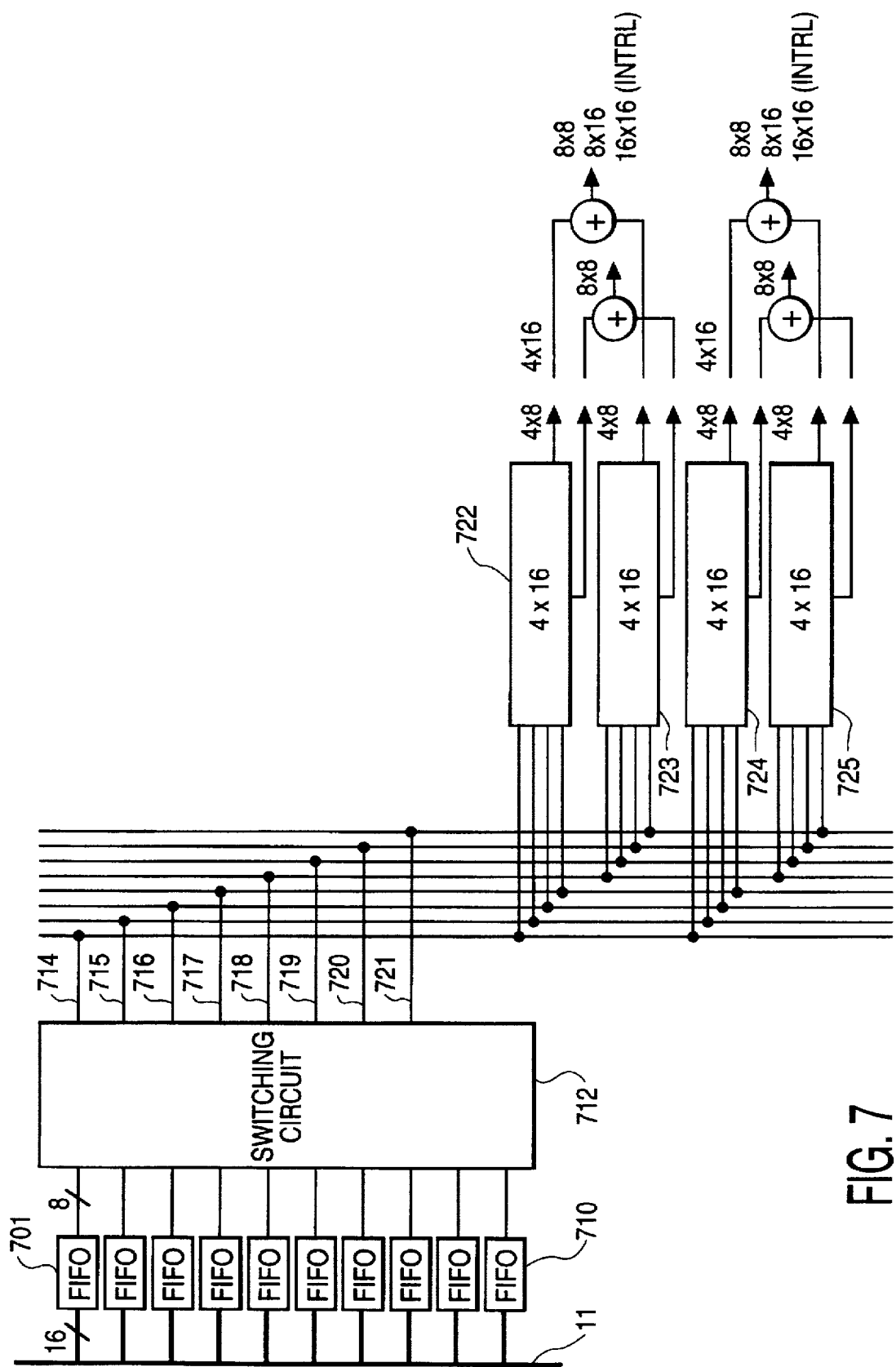
Figure 9A:
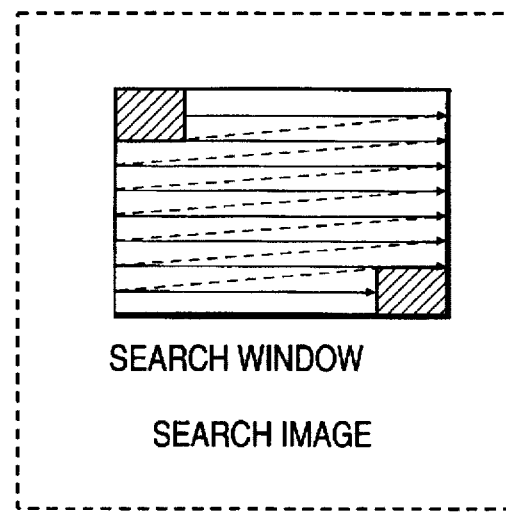
Figure 9B:
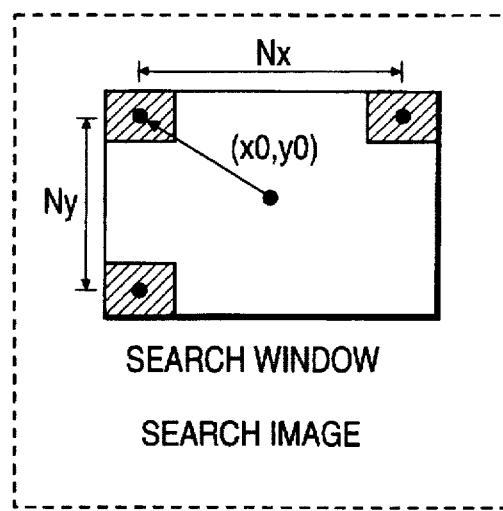
Figure 11:
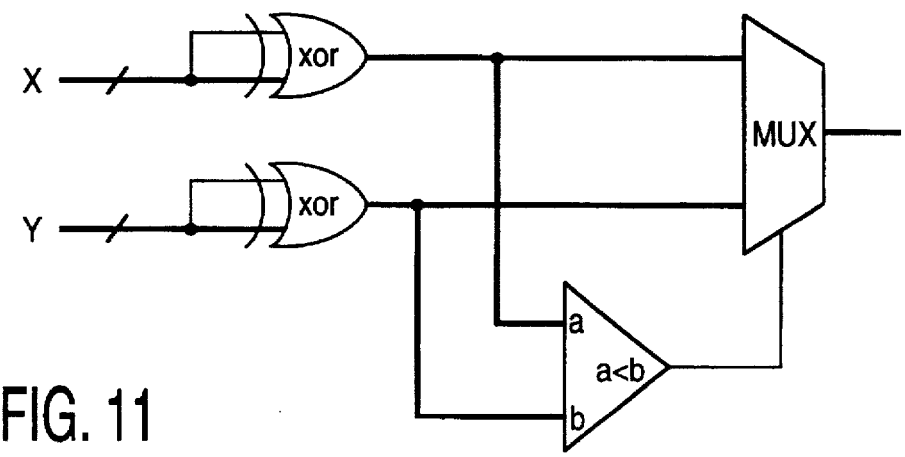
Figure 10:
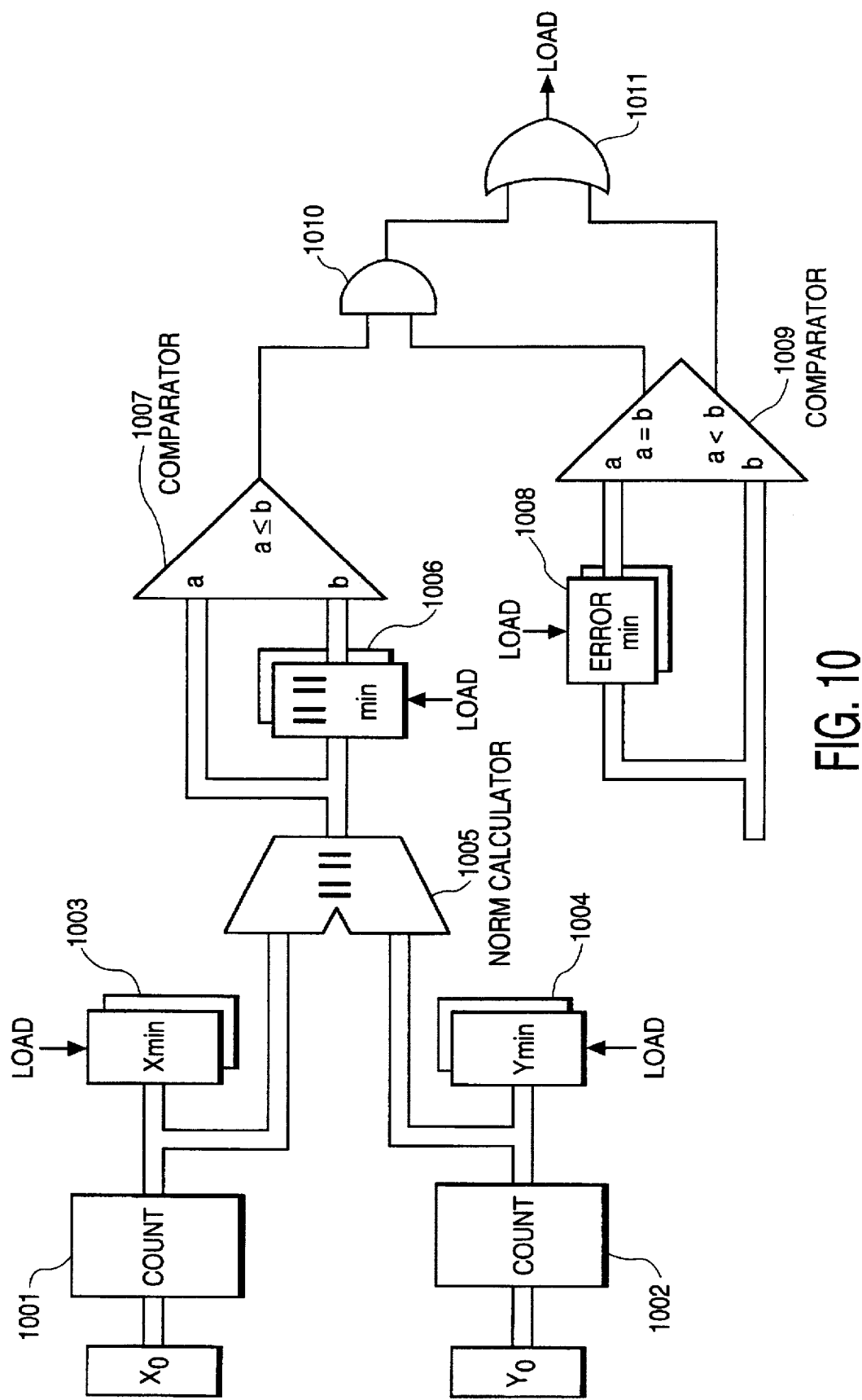

Other characteristics and advantages of the invention will emerge through the description of a non-limiting particular embodiment illustrated by the attached figures in which:

FIG. 1 represents a functional diagram of a motion estimation processor,

FIGS. 2a and 2b represent schematically an example of a comparison strategy employed, FIG. 3 represents a functional diagram of a systolic array used to calculate the motion vectors, FIG. 4 represents a functional diagram of a so-called "S" cell of the systolic array of FIG. 3, FIG. 5 represents a functional diagram of a simplified systolic array allowing the illustration of operation in non-interlaced mode, FIG. 6 represents a functional diagram of a simplified systolic array allowing the illustration of operation in interlaced mode, FIG. 7 represents a functional diagram of the coprocessor according to a first variant, FIG. 8 represents a functional diagram of the coprocessor according to a second variant, FIG. 9a is a sketch illustrating the way in which the current block is compared with the blocks of the search window in accordance with one exemplary embodiment of the invention, FIG. 9b illustrates the conventions adopted for the coordinates of a motion vector in accordance with the present exemplary embodiment, FIG. 10 is a functional diagram of a motion vector selection cell in accordance with the present exemplary embodiment of the invention, FIG. 11 represents the logic layout of the means for calculating the absolute value in accordance with the present exemplary embodiment.

Firstly, an exemplary motion estimation processor implementing the invention will be described. Most particular emphasis will be placed on the description of the coprocessor which is the element which performs the calculation of the error associated with each motion vector. The coprocessor and its systolic arrays form the subject of French Patent Application 94 10158 filed in the name of Thomson Consumer Electronics on 19 Aug. 1994.

The motion estimation processor makes it possible to calculate various types of motion vectors, depending on the requirements of the MPEG2 standard: vectors for frames or images, vectors from a previous image to a current image or from a future image to the current image ("forward vectors" and "backward vectors" respectively) etc. In what follows, for clarity of explanation, the example of forward vectors will be adopted. Of course, the invention is not limited to the exemplary embodiment presented.

FIG. 1 illustrates functionally a motion estimation processor 101. The processor 101 comprises a RISC controller 102 (RISC denoting: "Reduced Instruction Set Computer"), a systolic-array coprocessor 103, three independent input ports, 104, 105, 106 for loading the images, one output port 107 for supplying the motion vectors, as well as a local RAM and local ROM (referenced 108 and 109 respectively).

The presence of several independent input ports makes it possible to work on as many independent video sources. According to a variant embodiment, each input port is furnished with a sub-sampling circuit for the implementation of a hierarchized motion estimation.

The various sub-assemblies mentioned communicate across a data bus 111 which is among other things connected to an external DRAM memory 110. A memory management unit 112 handles the flow of data between the local memories. The data corresponding to the images (reference or current) are conveyed to the dynamic memory 110. They are next read out so as to be fed to the coprocessor 103 in good time. The motion vectors calculated by the coprocessor 103 are sent back to the dynamic memory 110 across a buffer memory MV BUFF 114. At the appropriate moment, these vectors are read out and transmitted by way of the output port 107.

The processor 101 is also furnished with a microprocessor interface 115 intended for programming and configuring the RISC controller 102 by remotely loading code and computational parameters. The motion vectors stored in the dynamic memory 110 are also accessible through the interface 115.

A unit MAX-AVR 113 calculates the mean motion vector and the maximum motion vector for each image.

The RISC controller 102 is, according to the present example, a 19-bit processor containing 62 registers and a 64-word data memory. The role of the controller 102 is to manage the requests of the various units of the processor 101 and to activate them in good time.

The RISC controller 102 is connected to the local RAM 108 and to the local ROM 109, the latter containing commonly used routines.

The coprocessor 103 includes several systolic arrays working in parallel or in series, depending on the programmed configuration. In what follows we shall first describe the operation of a single systolic array. This will provide for a better understanding of the operation of the coprocessor 103 which, according to the present example, combines 8 of these arrays.

FIG. 2a illustrates the flow of information in the systolic array. The basic function of the array is to compare a current pixel block with the contents of a reference window. The current block is stored in the systolic array 201. The reference window is conveyed to the array in strips. For each possible position, the error function Err is calculated.

An element 202 determines the most appropriate vector on the basis of the various values of the error function for the same current block but different blocks extracted from the search window. This element will be described in greater detail later.

FIG. 2b illustrates the process for determining the strips to be supplied to the systolic array. Each strip has a number of rows of pixels which corresponds to the number of rows in the array (4 in the present example). The first strip contains the first four rows of the reference window. When the first strip has been fully processed, the processing is continued with the next strip, which contains the last three rows of the first strip, as well as the row immediately following this first strip. Each strip is therefore shifted by one row with respect to the preceding strip.

Each strip is supplied to the systolic array column by column. The current block, having the same number of rows as each strip, is thus compared with all the blocks of like size of each strip. Ultimately, the current block will have been compared with all the blocks of like size of the reference window. As many values of the error function will have been calculated and transmitted to the element 202.

It will be noted that two consecutive strips differ only by a row of pixels. This redundancy will be harnessed further on in order to limit the loading of the data from the memory 10.

FIG. 3 illustrates a systolic array with four rows and five columns. This array comprises so-called "S" cells, buffers "B", adders "Add", bypass cells 301 and a final bypass cell 302.

The S cells perform the calculation |a−b|, where a and b are respectively values of a pixel of the current block and of a pixel of the reference window. The output of each S cell in the same row is connected by a buffer B to the input of the next S cell. A buffer B is also present in front of each first S cell of a row. The values of pixels b propagate from one buffer to a next buffer over the same row in each cycle. The buffers hold the values b while the S cells perform their calculations.

Each S cell also possesses an output C, which supplies the result of the operation |a−b|. The outputs C are also connected up to buffers B. All the buffers B of the same column are connected to the same adder Add. There are therefore as many adders as columns.

The output of an adder is connected to the input of the next adder via three buffers B in series. Depending on the mode of operation chosen, the last of these three buffers is or is not short-circuited via a bypass cell 301.

The final bypass cell supplies either a value of the error function in each cycle during normal non-interlaced operation, or a value of the error function every second cycle in interlaced mode. In the latter case, the adder integrated into this final bypass cell 302 adds together two consecutive values of the error function.

According to a variant embodiment, the adders Add are embodied with the aid of three-input carry save adders.

FIG. 4 represents the functions of a cell S in greater detail. The cell S comprises an input 401, an output 402 connected directly to the input 401, a calculating unit 403 possessing two inputs one of which is connected to the input 401 and the other to the output of a multiplexer 404 allowing the selection by way of a selection line 405 of either the contents of a buffer 406 or the contents of a buffer 407. The inputs of the buffers 406 and 407 are also connected to the input 401 of the cell.

Each of the two buffers contains a value of a pixel of a current block. These values are loaded through the input 401 at the appropriate moment. The buffer control circuits are conventional and will not be illustrated in further detail. The presence of two buffers in parallel makes it possible among other things to store two current blocks in one systolic array at the same time. Thus, it will be possible for two comparisons to be performed for one and the same position in the reference window. The quantity of data travelling between the dynamic memory 10 and the coprocessor 3 is thus reduced.

The presence of two buffers in each cell S moreover allows so-called interlaced operation which allows the number of rows of the current block to be doubled with respect to the number of rows of the systolic array. This operation will be addressed further on.

The calculating unit supplies the absolute value of the difference of the two values present at its inputs.

It will be noted that in the context of this example, the values b of the pixels of the reference window are stored in the buffers B between the cells S, whereas the values a of the pixels of the current block or blocks are stored in the buffers of the cells S.

It will also be noted that the functions of accumulation of the intermediate results produced by the cells S are carried out entirely by the adders at the foot of each column of cells S.

The normal (non-interlaced) operation of the systolic array will be explained with the aid of the layout of FIG. 5. This layout represents a systolic array comprising just one row and eight columns. The operation of an array with a larger number of rows is entirely similar, the results output by each cell S (output S) being presented to the adders simultaneously. In the context of normal operation, only two buffers B are necessary between each end-of-column adder. For the clarity of the layout, the third buffer and the bypass cell are not illustrated.

The pixel values a are already stored in the array. A value b is presented to the input of the array in each cycle. Table 1 represents the history of the outputs C over a number of cycles.

TABLE 1

| Cyc. | C0 | C1 | C2 | C3 | C4 | C5 | C6 | C7 |
|---|---|---|---|---|---|---|---|---|
| 0 | — | — | — | — | — | — | — | — |
| 1 | \|b0 − a0\| | — | — | — | — | — | — | — |
| 2 | \|b1 − a0\| | \|b0 − a1\| | — | — | — | — | — | — |
| 3 | \|b2 − a0\| | \|b1 − a1\| | \|b0 − a2\| | — | — | — | — | — |
| 4 | \|b3 − a0\| | \|b2 − a1\| | \|b1 − a2\| | \|b0 − a3\| | — | — | — | — |
| 5 | \|b4 − a0\| | \|b3 − a1\| | \|b2 − a2\| | \|b1 − a3\| | \|b0 − a4\| | — | — | — |
| 6 | \|b5 − a0\| | \|b4 − a1\| | \|b3 − a2\| | \|b2 − a3\| | \|b1 − a4\| | \|b0 − a5\| | — | — |
| 7 | \|b6 − a0\| | \|b5 − a1\| | \|b4 − a2\| | \|b3 − a3\| | \|b2 − a4\| | \|b1 − a5\| | \|b0 − a6\| | — |
| 8 | \|b7 − a0\| | \|b6 − a1\| | \|b5 − a2\| | \|b4 − a3\| | \|b3 − a4\| | \|b2 − a5\| | \|b1 − a6\| | \|b0 − a7\| |
| 9 | \|b8 − a0\| | \|b7 − a1\| | \|b6 − a2\| | \|b5 − a3\| | \|b4 − a4\| | \|b3 − a5\| | \|b2 − a6\| | \|b1 − a7\| |
| 10 | \|b9 − a0\| | \|b8 − a1\| | \|b7 − a2\| | \|b6 − a3\| | \|b5 − a4\| | \|b4 − a5\| | \|b3 − a6\| | \|b2 − a7\| |
| 11 | \|b10 − a0\| | \|b9 − a1\| | \|b8 − a2\| | \|b7 − a3\| | \|b6 − a4\| | \|b5 − a5\| | \|b4 − a6\| | \|b3 − a7\| |
| 12 | \|b11 − a0\| | \|b10 − a1\| | \|b9 − a2\| | \|b8 − a3\| | \|b7 − a4\| | \|b6 − a5\| | \|b5 − a6\| | \|b4 − a7\| |
| 13 | \|b12 − a0\| | \|b11 − a1\| | \|b10 − a2\| | \|b9 − a3\| | \|b8 − a4\| | \|b7 − a5\| | \|b6 − a6\| | \|b5 − a7\| |
| 14 | \|b13 − a0\| | \|b12 − a1\| | \|b11 − a2\| | \|b10 − a3\| | \|b9 − a4\| | \|b8 − a5\| | \|b7 − a6\| | \|b6 − a7\| |
| 15 | \|b14 − a0\| | \|b13 − a1\| | \|b12 − a2\| | \|b11 − a3\| | \|b10 − a4\| | \|b9 − a5\| | \|b8 − a6\| | \|b7 − a7\| |

During cycle 0, the value b0 is stored in the first buffer B (referenced 501) at the input of the array. It is only in cycle 1 that the result supplied by the first cell S is stored in the buffer 502 at the output C0. During cycle 1, the value b0 is also stored by the second buffer B 503.

At a given moment in the operation of the array, it will be required to retrieve at the output of the last adder the sum of all the absolute values of the differences corresponding to a given position in the current block (in this instance a row of 8 pixels) in the reference window. The results which are to be summed at adder level for the first row of the reference window are indicated in bold in the table.

This accumulation function conditions the delay introduced by the buffers 504 between the adders. It is seen that a delay of two cycles should be introduced in order for the propagation of the results at adder level to occur properly. This explains the presence of two buffers between each adder. Each buffer introduces a delay of one cycle. Stated otherwise, the two buffers 504 and 505 between the first two adders cancel the delay introduced by the buffers 501 and 502.

At the end of the fifteenth cycle, the value of the function Err for the first possible position of the current block is present at the output 506 of the array.

It will be noted that in this operation, only one of the two values a stored in each cell S is used. According to a variant embodiment, a single buffer for storing the pixel values of the current block is used in each cell S.

FIG. 6 and Table 7 illustrate the operation of a systolic array in the so-called interlaced mode. This mode makes it possible to determine error functions for current blocks containing a number of rows equal to double the number of rows of the systolic array. This is carried out simply by appending an extra buffer in each cell S as well as an extra buffer between each adder.

FIG. 6 is similar to FIG. 5, apart from the fact that an extra buffer is inserted between each pair of adders. Furthermore, each cell S includes the two internal buffers illustrated in FIG. 4. During the even cycles, the contents of the first buffer of each cell S are multiplexed to the corresponding calculating unit, whereas the contents of the second buffer are used during the odd cycles.

The last adder 601 of the array of FIG. 6 is connected on the one hand to a first input of an adder 602 and on the other hand to a buffer 603 whose output is connected to the second input of the adder 602.

The error function corresponding to a sub-block is supplied to the output of the adder 601 in each cycle (once the array has been correctly initialized).

Table 2 shows that the value of the error function corresponding to the sub-block a' lags one cycle behind that corresponding to the sub-block a. The two values must be added together to obtain the value of the error function corresponding to the complete block a+a'. During a first cycle, the value corresponding to a is stored in the buffer 603. In the next cycle, the value corresponding to the block a' is present at the output of the adder 601. The adder 602 carries out the sum. A valid result is therefore present at the output of the adder 602 every second cycle.

This operation in so-called interlaced mode is of great benefit since it enables the size of the data bus conveying the strips of pixels to the coprocessor to be reduced.

According to a variant embodiment, the systolic array is designed to process current blocks possessing a number of rows equal to N times the number of rows of the array, where N is an integer greater than 2.

TABLE 2

| Cyc. | C0 | C1 | C2 | C3 | C4 | C5 | C6 | C7 |
|---|---|---|---|---|---|---|---|---|
| 0 | — | — | — | — | — | — | — | — |
| 1 | fb0 − a0l | — | — | — | — | — | — | — |
| 2 | fb0' − a0'l | fb0 − a1l | — | — | — | — | — | — |
| 3 | fb1 − a0l | fb0' − a1'l | fb0 − a2l | — | — | — | — | — |
| 4 | fb1' − a0'l | fb1 − a1l | fb0' − a2'l | fb0 − a3l | — | — | — | — |
| 5 | fb2 − a0l | fb1' − a1'l | fb1 − a2l | fb0' − a3'l | fb0 − a4l | — | — | — |
| 6 | fb2' − a0'l | fb2 − a1l | fb1' − a2'l | fb1 − a3l | fb0' − a4'l | fb0 − a5l | — | — |
| 7 | fb3 − a0l | fb2' − a1'l | fb2 − a2l | fb1' − a3'l | fb1 − a4l | fb0' − a5'l | fb0 − a6l | — |
| 8 | fb3' − a0'l | fb3 − a1l | fb2' − a2'l | fb2 − a3l | fb1' − a4'l | fb1 − a5l | fb0' − a6'l | fb0 − a7l |
| 9 | fb4 − a0l | fb3' − a1'l | fb3 − a2l | fb2' − a3'l | fb2 − a4l | fb1' − a5'l | fb1 − a6l | fb0' − a7'l |
| 10 | fb4' − a0'l | fb4 − a1l | fb3' − a2'l | fb3 − a3l | fb2' − a4'l | fb2 − a5l | fb1' − a6'l | fb1 − a7l |
| 11 | fb5 − a0l | fb4' − a1'l | fb4 − a2l | fb3' − a3'l | fb3 − a4l | fb2' − a5'l | fb2 − a6l | fb1' − a7'l |
| 12 | fb5' − a0'l | fb5 − a1l | fb4' − a2'l | fb4 − a3l | fb3' − a4'l | fb3 − a5l | fb2' − a6'l | fb2 − a7l |
| 13 | fb6 − a0l | fb5' − a1'l | fb5 − a2l | fb4' − a3'l | fb4 − a4l | fb3' − a5'l | fb3 − a6l | fb2' − a7'l |
| 14 | fb6' − a0'l | fb6 − a1l | fb5' − a2'l | fb5 − a3l | fb4' − a4'l | fb4 − a5l | fb3' − a6'l | fb3 − a7l |
| 15 | fb7 − a0l | fb6' − a1'l | fb6 − a2l | fb5' − a3'l | fb5 − a4l | fb4' − a5'l | fb4 − a6l | fb3' − a7'l |
| 16 | fb7' − a0'l | fb7 − a1l | fb6' − a2'l | fb6 − a3l | fb5' − a4'l | fb5 − a5l | fb4' − a6'l | fb4 − a7l |

The current block of double the size is split into two sub-blocks a and a' lying vertically one above the other. The first sub-block a is stored in the first buffers of each cell S, whereas the second sub-block a' is stored in the second buffers of each cell S.

In identical fashion, the strip of the reference window possesses double the number of rows. It comprises a top sub-strip b and a bottom sub-strip b'. During an even cycle, a column of the sub-strip b is presented to the input of the systolic array, whereas a column of b' is presented during the odd cycles.

Table 2 gives the state of the outputs c after each cycle. Just as before, the bold characters indicate the intermediate results which are required to be added up to form an error function corresponding to a sub-block.

Alternating between the two sub-blocks and the two sub-strips introduces, as compared with non-interlaced operation, an extra lag of one cycle between the presence at the output of an adder of the cumulative error corresponding to a given position and the presence of the corresponding intermediate result at the input of the next adder. For this reason, a third buffer is inserted between each pair of adders.

FIG. 7 represents schematically the coprocessor according to a first variant of the exemplary embodiment. According to this variant, the coprocessor comprises ten first-in first-out stacks (FIFO stacks) 701 to 710, connected in parallel with the data bus 11. The number of data words per FIFO determines the number of columns of pixels in the search window. The outputs of the stacks 701 to 710 are connected to a switching circuit 712 possessing ten inputs and eight outputs 714 to 721.

The circuit 712 allows the output of any of the ten FIFOs to be connected up to any of the eight outputs of the circuit. Each FIFO contains a complete row of the search window. The eight FIFOs connected up to an output at a given moment correspond to the rows of the strip of the processed search window.

The two extra FIFOs which are not connected up are loaded by way of the data bus from the data stored in the memory 10. The loaded data correspond to the rows of the search window which differ with respect to the strips being processed.

Let us assume for example that the first strip of eight rows L1 to L8 of a search window is contained in the FIFOs 701 to 708. During the processing of these eight rows, row L9 is loaded into the FIFO 709. When the processing of the first strip has terminated, row L1 stored in the FIFO 701 becomes superfluous. The second strip in fact contains rows L2 to L9. The processing of this second strip can therefore begin without any idle time, since the entire strip is present in the FIFOs. The "crossbar" type switching circuit 802 will be responsible for re-establishing the correct order of the rows stored before presentation to the systolic arrays 722 to 725.

In the case in which the strips have eight rows, nine FIFOs are sufficient for the operation described. The tenth FIFO is used for example when processing two strips of four rows in parallel.

According to the present variant, four systolic arrays 722 to 725 with four rows and sixteen columns each are connected up to the outputs of the switching circuit. By convention, the output 714 will be said to represent the top row of a strip of eight rows, whereas the output 721 represents the bottom row. The first and third arrays (722 and 724 respectively) are connected up to the top four outputs 714 to 717, whereas the second and fourth arrays (723 and 725 respectively) are connected up to the bottom four outputs 718 to 721.

The above arrangement enables current blocks of different sizes to be processed in a flexible manner. It is in fact possible to consider the four arrays in different ways:

Eight arrays of 4*8 elements, each array of 4*16 elements processing two current blocks of 4*8 elements;

Four arrays of 8*8 elements;

Two arrays of 8*16 elements;

Two arrays of 16*16 elements.

In the latter case, the arrays work in interlaced mode, only eight outputs being available rather than sixteen. The eight outputs will alternately supply columns of eight pixels of a top strip and of a bottom strip of the reference window.

It is of course conceivable to use sixteen FIFOs instead of eight (without counting the FIFOs required for loading the next row).

As was stated earlier, the depth of the FIFOs determines the width of the reference window. In the case when working with arrays of 4*8 elements, it is possible to group the FIFOs in twos and to store the equivalent of a row of pixels of double the length in each pair of FIFOs.

FIG. 7 furthermore indicates in the form of arrows the manner of grouping the calculation results at the output of each array of 4*16 elements depending on the mode of operation.

FIG. 8 illustrates a second variant of the exemplary embodiment. Nine FIFOs (grouped together under the reference 801) feed a switching circuit 802. The coprocessor according to the present example contains eight systolic arrays 803 to 810 of 4*8 elements. In fact, two cascaded 4*8 arrays of FIG. 8 are equivalent to one 4*16 array of FIG. 7. FIG. 8 provides a better illustration of the routing of the results of calculation of each of the arrays when eight current blocks of 4*8 are processed in parallel. The top two arrays 803 and 804 will be adopted as an example. The final result (that is to say the value of the error function) at the output of the array 803 is transmitted directly to the array 804. Depending on whether working with eight current blocks of 4*8 or four current blocks of 8*8, this result at the output of the array 803 has or does not have to be available for later processing. In the case when working with 8 current blocks of 4*8 pixels, this result will be required for the determination of the motion vector of the current block processed by the array 803.

According to the present variant embodiment, a cell M is associated with each array of 4*8 elements. Each cell M determines the minimum value of the error function output by one of the arrays from among all the error values associated with a block and keeps in memory the coordinates of the corresponding motion vector. The results are communicated through a special data bus 811.

The outputs of the arrays 803 and 804, 807 and 808 are each connected up to the input of a two-input multiplexer, the output of which is connected up to the input of the associated cell M. The output of each of the same arrays is also connected up to the input of a two-input adder which receives on its other input the output from the array immediately beneath. For the arrays 803, 804, 807 and 808, these are respectively the outputs from the arrays 805, 806, 809 and 810.

When the processor works on eight current blocks of 4*8 pixels each, the output of each array is connected directly to the associated cell M. Each cell M then determines, in a stand-alone manner, the minimum value of the error function and the motion vector. This results in eight distinct vectors. The values of the error function output by the arrays 803, 805, 807 and 809 are not transmitted to the arrays which follow them in series. The multiplexer which carries out this transmission or non-transmission is not illustrated in the layouts.

When the processor works on four blocks of 8*8 pixels, the multiplexers switch over so that one of the cells M associated with two overlying arrays working on the same block receives the sum of the values of the error functions calculated by these two arrays. For example, the cell M associated with the array 803 will perform its calculations on the basis of the values of the error function corresponding to the 8*8 block processed in the arrays 803 and 805. A single vector will result from this. As in the case of the previous paragraph, the values of the error function which arise from the first column of arrays are not transmitted to the second column.

When the processor works on two blocks of 8*16 pixels, only the cells M associated with the arrays 804 and 808 are used. The pairs of 4*8 arrays 803 and 804, 805 and 806, 807 and 808 and finally 809 and 810 are regarded as each forming just one continuous array of dimension 4*16. For example, the adder associated with the array 804 adds up the errors output by the arrays 804 and 806. The values of the error function which are calculated by the arrays 803 and 805 are included within the values of the error function which are calculated by the arrays 804 and 806 and are transmitted to these latter values by way of the connections between the arrays 803 and 804 respectively 805 and 806.

In the case of the interlaced mode, the principle is identical. Put simply, the cell or cells M hold two motion vectors in memory, one for each block.

The switching of the multiplexers is controlled by the controller 2 of FIG. 1, as a function of the chosen mode of operation.

Each cell M comprises the device according to the present exemplary embodiment. This device is illustrated by FIG. 10.

It comprises two counters 1001 and 1002 which contain the coordinates X and Y of the motion vector corresponding to the block of the reference window being examined at present. The counter 1001 contains the abscissa X of the vector, whereas the counter 1002 contains the ordinate Y.

The counter 1001 is initialized to a value X0 each time the introduction into the array of a new strip of the search window is begun, that is to say each time the row is accessed. It is incremented for each pixel or column of pixels introduced into the array.

The counter 1002 is initialized to a value Y0 when changing search window. It is incremented for each new strip introduced into the array.

The values X0 and Y0 correspond to the relative coordinates of the block of the search window with respect to the position of the current block in this window. This relation is illustrated by FIG. 9b. FIG. 9a indicates the comparison strategy. The first block of the reference window which is compared with the current block is the block in the top left corner of the window. The comparison continues with the other blocks of the same strip, from left to right. Each strip begins with the leftmost block.

X and Y therefore go on increasing during the scanning of the reference window.

The cell M furthermore comprises two registers Xmin 1003 and Ymin 1004, connected respectively to the counters 1001 and 1002. Each resister is capable of storing the contents of the associated counter if it receives a load signal produced by another part of the cell. At any moment the registers Xmin and Ymin contain the coordinates of the motion vector corresponding most closely to the selection criteria at a given moment of the search.

The output of each counter is connected to one of the two inputs of a norm calculating circuit 1005. The circuit 1005 calculates a norm from the coordinates X and Y of the vector examined at a given moment.

The function realized by the circuit 1005 may be any norm function, such as the classical function:

$$\sqrt{(X^2 + Y^2)} \quad (1)$$

In what follows, the norm function realized will be:

$$\|(x,y)\| = \max\{|x|,|y|\} \quad (2)$$

The advantages of this function (2) per se, but particularly in conjunction with the two's complement code will be seen further on, during the detailed description of the circuit 1005.

The function (2) is less expensive to implement than the function (1). Moreover, the results obtained with the function (2) are identical to those obtained with the function (1) when the vectors are almost horizontal or vertical. The approximation gets worse as the vectors slope by 45 degrees with respect to the horizontal or to the vertical. However, the results obtained are entirely satisfactory.

The output of the circuit 1005 is connected up to a register 1006 and to one of the inputs of a two-input comparator 1007. The loading of the register 1006 is controlled by the same signal as the loading of the registers 1003 and 1004. The norm stored by the register 1006 is supplied to the second input of the comparator 1007. The latter supplies a signal representing a logic "1" when the norm stored is greater than or equal to the norm output by the circuit 1005.

The value of the error function corresponding to the vector whose coordinates are given by the two counters is supplied to a fourth register 1008 and to an input of a comparator 1009. The register 1008 is also controlled by the "Load" signal. The stored value is supplied to a second input of the comparator 1009, which supplies a first signal representing a logic "1" when the value stored in the register 1008 is less than that present on the other input of the comparator and a second signal representing a logic "1" when these values are equal.

The output from the comparator 1007 and the output from the comparator 1009 corresponding to the equality of the signals at its input feed the inputs of a logic "AND" 1010.

Furthermore, the output from the comparator 1009 corresponding to strict inferiority feeds one of the inputs of a two-input logic "OR" 1011, the other input of which is fed with the output from the logic "AND". The output from the "OR" corresponds to the "Load" signal.

The operation of the cell is as follows: the values of the error function arrive at the rate of the calculations on the input of the cell. These values are compared with the minimum value stored in the register 1008, this register being set to a maximum value for each search of a given macro-block in a given reference window.

If the value present at the input of the cell is strictly less than the stored intermediate minimum value, the "Load" signal is activated by way of the "OR" 1011. The coordinates of the corresponding motion vector are stored in the registers 1003 and 1004, whereas the corresponding norm is stored in the register 1006.

If the value of the error function present at the input of the cell is strictly greater than that stored, the stored motion vector does not change.

If the value of the error function present at the input of the cell is equal to that stored, an extra condition is necessary for the vector corresponding to the new value to replace the previously stored vector: the norm of the new vector must be less than that of the old vector. This comparison is carried out by the comparator 1007. This extra condition allows for a better choice of motion vector in the case in which the values of the error function are identical for several different motion vectors.

FIG. 11 illustrates in more detail the contents of the norm calculating circuit 1005 in the case in which this calculation is performed on the basis of the function (2).

In accordance with the code used by the counters 1001 and 1002, the contents of the circuit 1005 vary so as to perform a different calculation to obtain the absolute value. Here are three examples:

(a) Signed binary numbers:
$|a| = a$ if $a >= 0$
$= -a$ if $a < 0$ (b) Two's complement number:
$|a| = a$ if $a >= 0$
$= \text{NOT}(a) + 1$ if $a < 0$ (c) 1's complement number:
$|a| = a$ if $a >= 0$
$= \text{NOT}(a)$ if $a < 0$ By applying the absolute value corresponding to the 1's complement to 2's complement coded numbers, it can be readily seen from points b and c above that an error of 1 bit of lowest value is made in the case where a is strictly negative. No error is made in the case where a is positive. Comparing the norms on the basis of such a "modified" absolute value introduces an incorrect decision only in limiting cases where the difference of the norms in absolute value is 1. For example, the vectors (−2,0) and (1,0) will have the same norm. This is not problematic insofar as the error made is minimal, being equal to the value of a bit of lowest order.

The vectors (−1,0) and (0,0) will also have the same norm. This defect can be minimized by using a non-strict comparator 1007. In this case, it will always be the last vector out of all the vectors having the same norm (and corresponding to the minimum value of the error function) that will be taken into account. If the vectors (−3,0), (−2,0), (−1,0), (0,0), (1,0), (2,0) correspond to this minimum value, the vector (0,0) will be the vector finally chosen.

In general, when a choice between a vector having a positive component and a vector having a negative component is allowed, the vector having the positive component will be chosen. In this way the number of vectors having an error of one pixel is minimized.

Even when this error is made, it can be corrected later by a finer motion estimator (for example at the half-pixel level).

When the absolute value corresponding to the 1's complement is applied to the 2's complement coded numbers output by the counters, taking the absolute value amounts to performing an exclusive OR between the sign bit of the two's complement coded number and the other bits of the same number. This is illustrated by FIG. 11. The results of the two exclusive ORs corresponding to the two coordinates are compared to determine the larger of the two absolute values. A multiplexer then multiplexes the larger of the values to the output of the circuit 1005, in accordance with the result of the comparison.

It is of course possible to apply the absolute value of the two's complement to the calculation of the norm, this however requiring the use of an extra adder.

The cell illustrated by FIG. 10 and described in conjunction with the present exemplary embodiment is a cell suitable for those modes of the systolic-array coprocessor for which a systolic array calculates only the data corresponding to a single motion vector at a given moment. As mentioned earlier, operation is possible in which a systolic array stores two distinct blocks and supplies one result for each block every second cycle. Those skilled in the art will easily be able to adapt the motion vector selection cell described above to such operation, in particular by providing extra registers for storing the components of the vectors corresponding to the two blocks.

We claim:

1. Method of selecting motion vectors in a system comprising a motion estimator, said motion estimator calculating values of an evaluation function, each value corresponding to a block of pixels of a reference window with respect to a current block of pixels, the relative position of said blocks being describable by a motion vector, said method comprising the steps of:

determining a smallest value of said evaluation function;

calculating norms of vectors associated with said smallest value;

comparing said norms; and selecting from said associated vectors a vector having a smallest norm.

2. Method according to claim 1, wherein said calculating step comprises calculating the function:

$$\|(X,Y)\| = \max\{|X|,|Y|\}$$

where X and Y represent the coordinates of a vector.

3. Method according to claim 2, further including the step of reversing the bits of a coordinate when said coordinate is negative to obtain a modified absolute value of a two's complement coded coordinate.

4. Method according to claim 1, wherein the reference window is scanned in such a way that the coordinates of the motion vectors are increasing functions, and that when several vectors correspond to said smallest value of the evaluation function, the last vector in the order of scanning is chosen.

5. Method according to claim 1, wherein said evaluation function is of the form:

$$Err(m,n) = \sum_i \sum_j D(a(i,j), b(i+m, j+n))$$

$$\text{with } D(x,y) = |x - y| \text{ or } D(x,y) = \sqrt{x^2 + y^2}.$$

6. An image processing device comprising a motion estimator, said motion estimator calculating values of an evaluation function, each value corresponding to a block of pixels of a reference window with respect to a current block of pixels, the relative position of said blocks being described by a motion vector, said device comprising:

means for calculating the norm of the motion vectors;

means for comparing values of an evaluation function associated with each of said vectors;

means for comparing the norm of at least the vectors associated with a desired value of said evaluation function; and means for storing one of the vectors possessing the smallest norm.

7. Device according to claim 6, wherein said evaluation function is a function of the distortion existing between said current block and said block of the reference window.

8. Device according to claim 6, wherein said means for calculating the norm of a vector include logic gates performing an exclusive OR (XOR) between each component (X,Y) of the vector and an associated sign bit.

9. Device according to claim 8, wherein said norm calculating means includes a comparator and a multiplexer for determining the smallest value of components output from said exclusive OR function.

* * * * *

UNITED STATES PATENT AND TRADEMARK OFFICE
CERTIFICATE OF CORRECTION

PATENT NO.  : 5,717,615
DATED       : Feb. 20, 1998
INVENTOR(S) : Alain Pirson and Didier Charlot It is certified that error appears in the above-identified patent and that said Letters Patent is hereby corrected as shown below:

Title page, item [75], change inventor's name from "Didier Chariot" to

--Didier Charlot--;

Column 7, line 13, change "Table 7" to --Table 2--.

Signed and Sealed this

Fifteenth Day of December, 1998

Attest:

BRUCE LEHMAN

Attesting Officer

Commissioner of Patents and Trademarks